(12) United States Patent
Epitaux

(10) Patent No.: US 6,628,881 B2
(45) Date of Patent: Sep. 30, 2003

(54) FIBER CARRIER AND METHOD FOR USING THE SAME

(75) Inventor: Marc Epitaux, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 169 days.

(21) Appl. No.: 09/896,404

(22) Filed: Jun. 28, 2001

(65) Prior Publication Data

US 2003/0002841 A1 Jan. 2, 2003

(51) Int. Cl.[7] ................................................. G02B 6/00
(52) U.S. Cl. ........................ 385/137; 385/135; 385/136
(58) Field of Search ................................. 385/135–137

(56) References Cited

U.S. PATENT DOCUMENTS

| | | | |
|---|---|---|---|
| 5,182,789 A | * | 1/1993 | Nash-Stevenson et al. . 385/137 |
| 5,881,198 A | * | 3/1999 | Haake ......................... 385/136 |
| 6,207,950 B1 | | 3/2001 | Verdiell |
| 6,227,724 B1 | | 5/2001 | Verdiell |
| 2002/0031323 A1 | * | 3/2002 | Hattori et al. .............. 385/137 |

* cited by examiner

Primary Examiner—Edward E. Glick
Assistant Examiner—Therese Barber
(74) Attorney, Agent, or Firm—Blakely, Sokoloff, Taylor & Zafman LLP

(57) ABSTRACT

A fiber carrier and method for using the same are described. A portion on the fiber carrier is activated to enable the fiber carrier to receive a first portion of the fiber, and the fiber carrier is closed. The fiber carrier is moved to a predetermined position. The portion on the fiber carrier is activated to release the fiber.

33 Claims, 8 Drawing Sheets

700

```
┌─────────────────────────────────────────────────────────────┐
│ Activate a portion on the fiber carrier to enable the fiber carrier to │ ~ 710
│           receive a first portion of the fiber              │
└─────────────────────────────────────────────────────────────┘
                            │
                            ▼
┌─────────────────────────────────────────────────────────────┐
│ Attach a flexure to a second portion of the fiber away from the first │ ~ 720
│                    portion of the fiber                     │
└─────────────────────────────────────────────────────────────┘
                            │
                            ▼
┌─────────────────────────────────────────────────────────────┐
│         Move the fiber carrier to a predetermined position  │ ~ 730
└─────────────────────────────────────────────────────────────┘
                            │
                            ▼
┌─────────────────────────────────────────────────────────────┐
│        Activate the portion on the fiber carrier to release │ ~ 740
│                          the fiber                          │
└─────────────────────────────────────────────────────────────┘
                            │
                            ▼
┌─────────────────────────────────────────────────────────────┐
│         Place the fiber carrier on a manufacturing station  │ ~ 750
└─────────────────────────────────────────────────────────────┘
```

Figure 7

FIBER CARRIER AND METHOD FOR USING THE SAME

FIELD OF THE INVENTION

The present invention relates generally to fiber optic manufacturing, and more particularly, to a fiber carrier to carry optical components such as, for example, an optical fiber.

BACKGROUND

In high performance optoelectronic packages, critical optical elements require more precise placement than can be obtained with the combination of platform height control and two-dimensional pick and place. This is the case of single mode fibers, which have to be aligned within less than a micron precision to achieve high optical coupling efficiency. Currently, ferrules are used with fibers. A ferrule is a component used to align and protect the stripped end of a fiber. An example of a ferrule may be a rigid glass tube. A ferrule is generally used together with a connector that connects the fiber to either another fiber or to a transmitter or receiver.

Generally, there is a need to carry optical elements such as optical fibers from one location to another without causing any harm to the optical element. In doing this, several problems may arise. One problem is with regard to locking the fiber in place in the carrier. Due to the small size of the optical element (optical fiber) and the bulky size of the carrier, it may be difficult to lock the fiber into place within the carrier. Another problem arises in attempting to prevent any damage to the fiber while it is being carried. Yet another problem involves designing an optical element carrier that is fully functional and that may still be integrated into a fully automated process where another machine controls the optical element carrier's actions. There may also be problems with mechanical accessibility and alignment.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7 is a flow diagram of an embodiment of using a fiber carrier to facilitate in the manipulation of a fiber.

DETAILED DESCRIPTION

A fiber carrier and method for using the same are described. In the following description, for purposes of explanation, numerous specific details are set forth in order to provide a thorough understanding of the present invention. It will be apparent, however, to one skilled in the art that the present invention can be practiced without these specific details.

Figure 1:
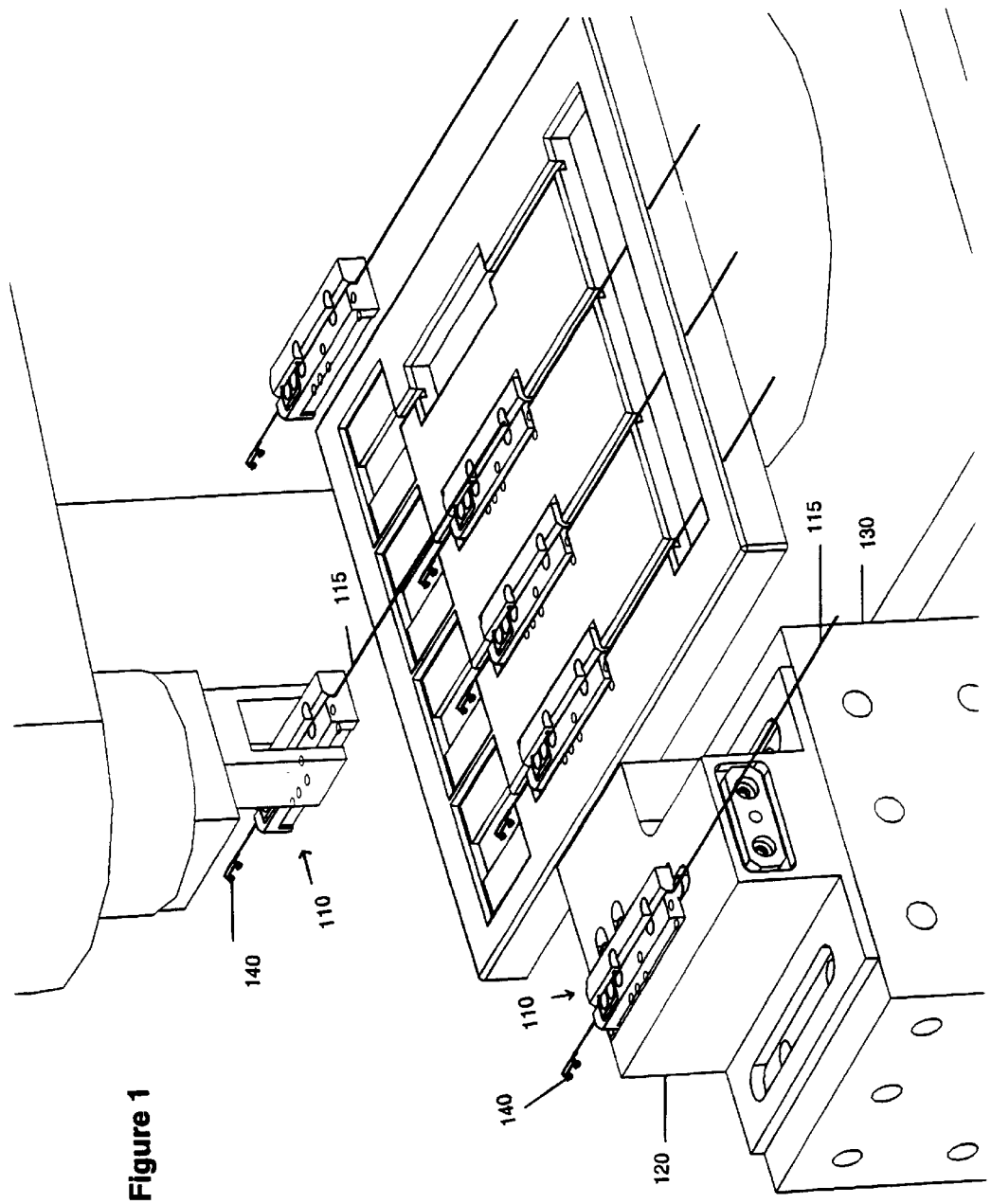
FIG. 1 illustrates one embodiment of a manufacturing station including a fiber carrier.

FIG. 1 illustrates one embodiment of a manufacturing station including a fiber carrier 110. As illustrated in FIG. 1, a fiber 115 may be manipulated using a fiber carrier 110. In one embodiment, a flexure 140 is attached to the fiber 115. Further detail about flexures may be found in U.S. Pat. No. 6,207,950, entitled "Optical Electronic Assembly Having A Flexure For Maintaining Alignment Between Optical Elements" issued on Mar. 27, 2001, and U.S. Pat. No. 6,227,724, entitled "Method For Constructing An Optoelectronic Assembly" issued on May 5, 2001, and both commonly assigned herewith.

In one embodiment, as seen in FIG. 1, a manipulating mechanism moves the fiber carrier 110 holding the fiber 115 from a tray capable of holding many fiber carriers to the baseplate 120. In this manner, the fiber carrier 110 helps locate the fiber 115 in the tray. The base plate 120 sits on a carrier stand 130. As seen in FIG. 1, the size of the fiber carrier 110 allows for easier handling than if the manipulating mechanism had to handle the fiber 115 itself. In addition, the fiber 115 may be easily damaged as opposed to the fiber carrier 110 which may be handled with less caution. Accordingly, use of the fiber carrier 110 facilitates in automating the process of manipulating an optical fiber, thereby decreasing the risk of mishandling and breakage.

In one embodiment, the fiber carrier 110 may be used to orient the fiber. For example, if the fiber has a particular direction or has an end with an angle end (such as a fiber with a coating to direct light in a particular direction) the fiber may have to be rotated. This rotation may be accomplished by rotating the fiber carrier 110.

Figure 2:
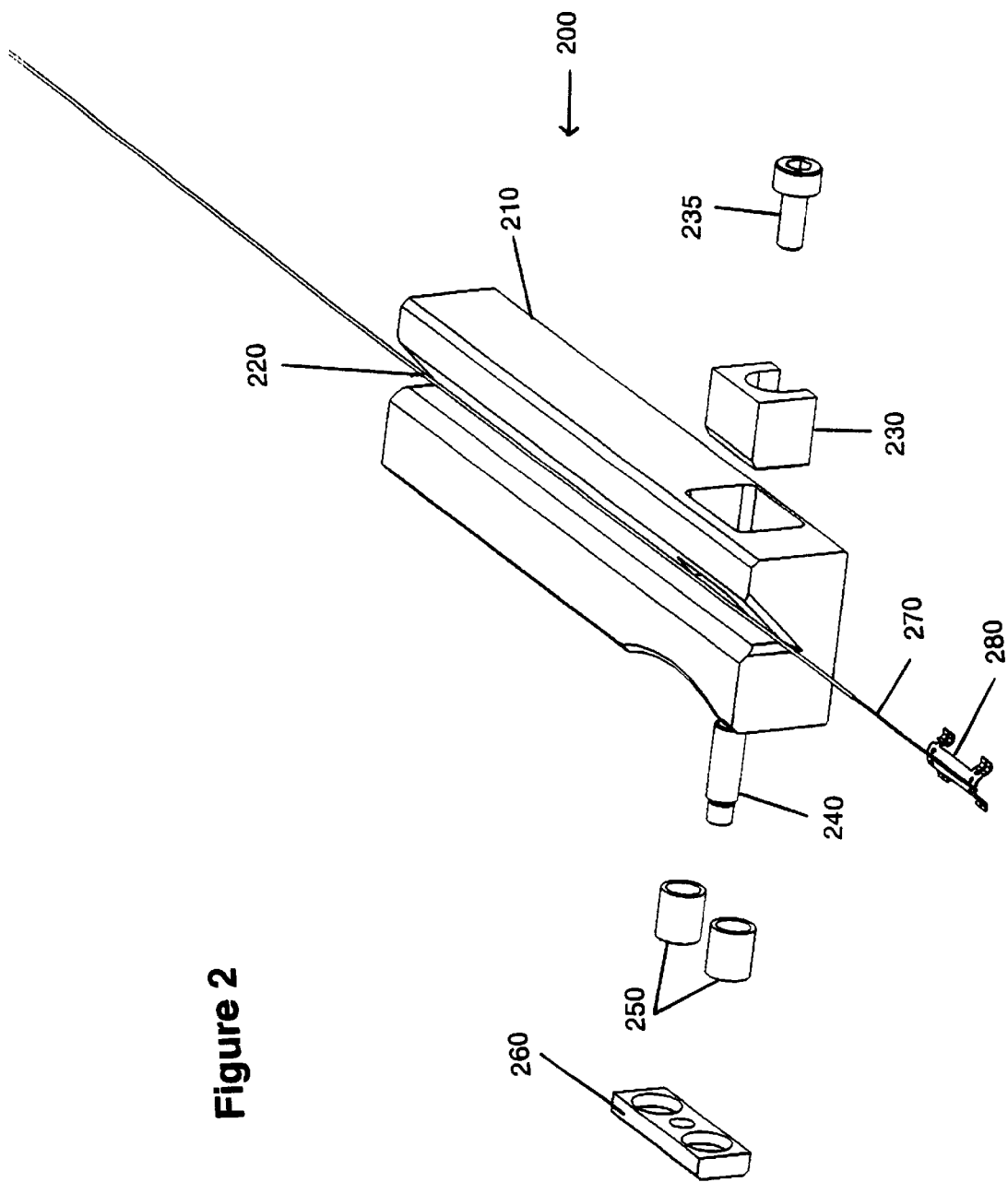
FIG. 2 illustrates a three-dimensional view of one embodiment of a fiber carrier.

FIG. 2 illustrates a three-dimensional view of one embodiment of a fiber carrier 200. The fiber carrier 200 includes a fiber carrier base 210 having a groove 220 where an optical fiber 270 may be encased. In one embodiment, the fiber carrier 200 includes a fiber carrier push plate 260, a set of compression springs 250, and a fiber carrier shaft 240 that work with a clamp 230 and a screw 235 to hold the optical fiber 270 in place once the fiber 270 is in the groove 220. Alternative embodiments may include other ways in which to hold the fiber 270 in place. FIG. 2 shows the fiber 270 attached to a flexure 280. An alternative embodiment of the fiber carrier is shown in FIG. 3.

Figure 3:
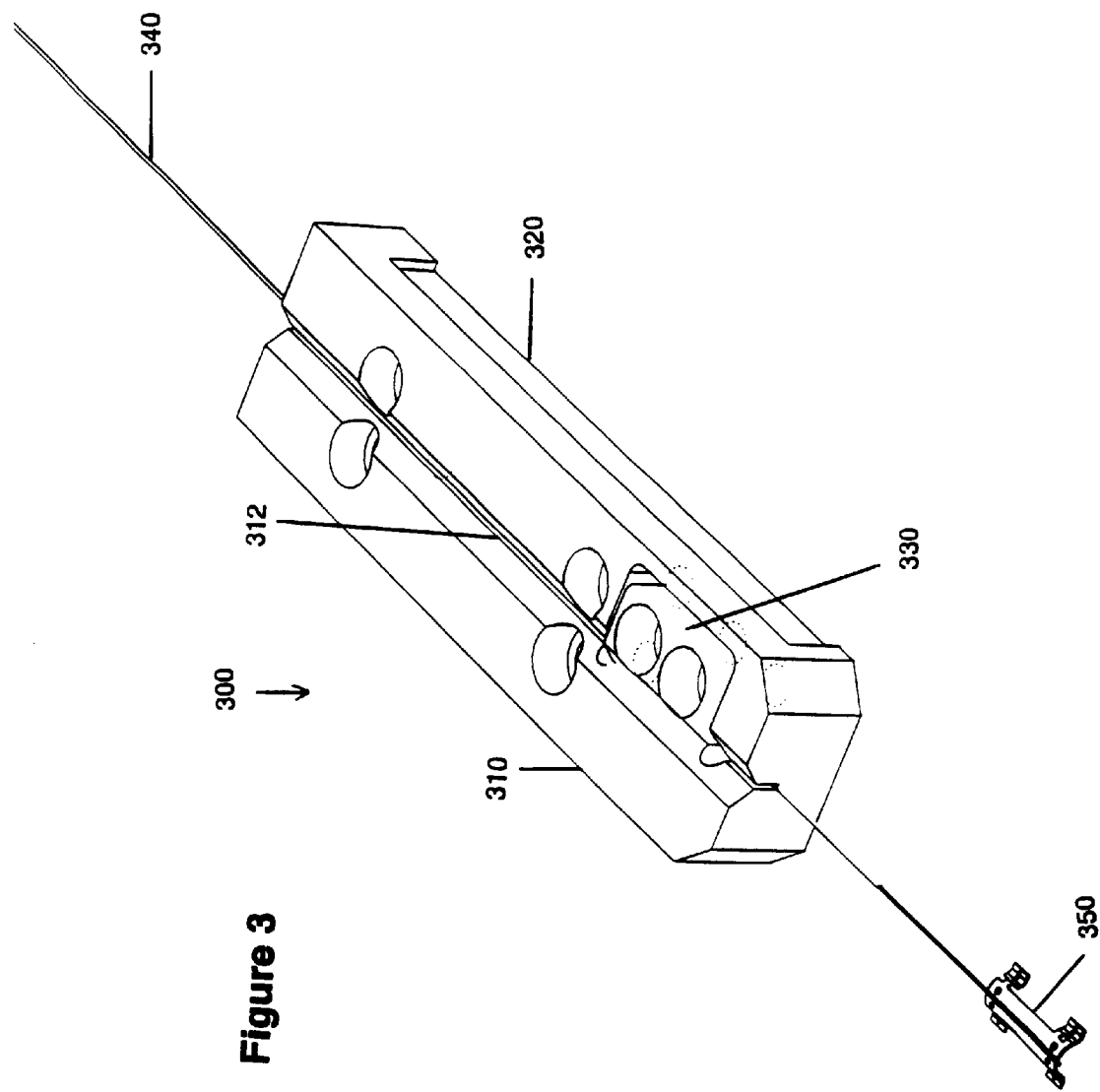
FIG. 3 illustrates a three-dimensional view of an alternative embodiment of a fiber carrier.

FIG. 3 illustrates a three-dimensional view of an alternative embodiment of a fiber carrier 300. The fiber carrier 300 includes a base piece 310, a bottom piece 320, and a clamp 330. As seen in FIG. 3, the bottom piece 320 is coupled with the base piece 310. The bottom piece 320 is also coupled with the clamp 330. In this embodiment, the clamp 330 fits into an indented area on top of the base piece 310. The indented area may be cut out from the top of the base piece 310. In an alternative embodiment, the base piece 310 may be molded to include the indented area.

As seen in FIG. 3, the base piece 310 includes a groove 312 to hold an optical element such as an optical fiber 340. The clamp 330 serves to lock the fiber 340 into place within the slot 312 so that the fiber carrier 300 may carry the optical fiber 340 securely. The clamp 320 may be designed in such a way as to apply enough pressure to the fiber 340 to hold the fiber 340 in place without damaging the fiber 340. In FIG. 3, a flexure 350 is shown to be attached to the fiber 340.

Figure 4:
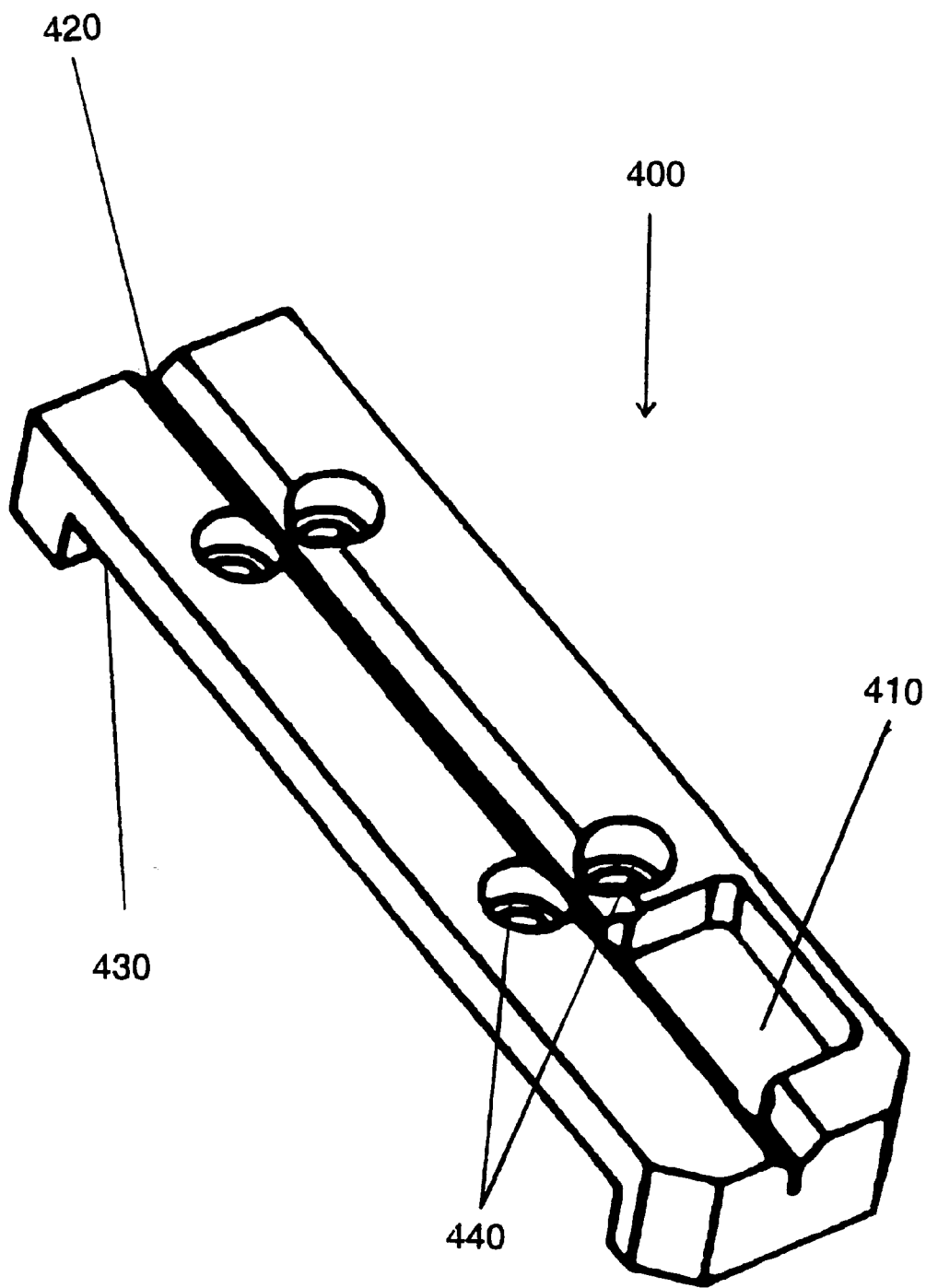
FIG. 4 illustrates a three-dimensional view of one embodiment of a base piece shown in FIG. 3.

FIG. 4 illustrates a three-dimensional view of one embodiment of the base piece 400 shown in FIG. 3. The base piece 400 includes an indented area 410 on which the clamp sits relative to the base piece and a slot 420 where an optical element such as a fiber may be placed. As the optical element is pushed into place by the clamp, one side of the optical element is held in place by the base piece 400. The base piece 400 also includes an indented area 430 on the underside of the base piece 400 where the bottom piece sits relative to the base piece 400. One or more apertures 440 may be included in the base piece 400 to allow one or more fasteners to couple the base piece 400 with the bottom piece. In one embodiment, the fastener may be a screw. In alternative embodiments, other types of fasteners may be used.

In one embodiment, the base piece may be made of steel. In an alternative embodiment, the base piece may be made of another material such as a hard plastic.

Figure 5:
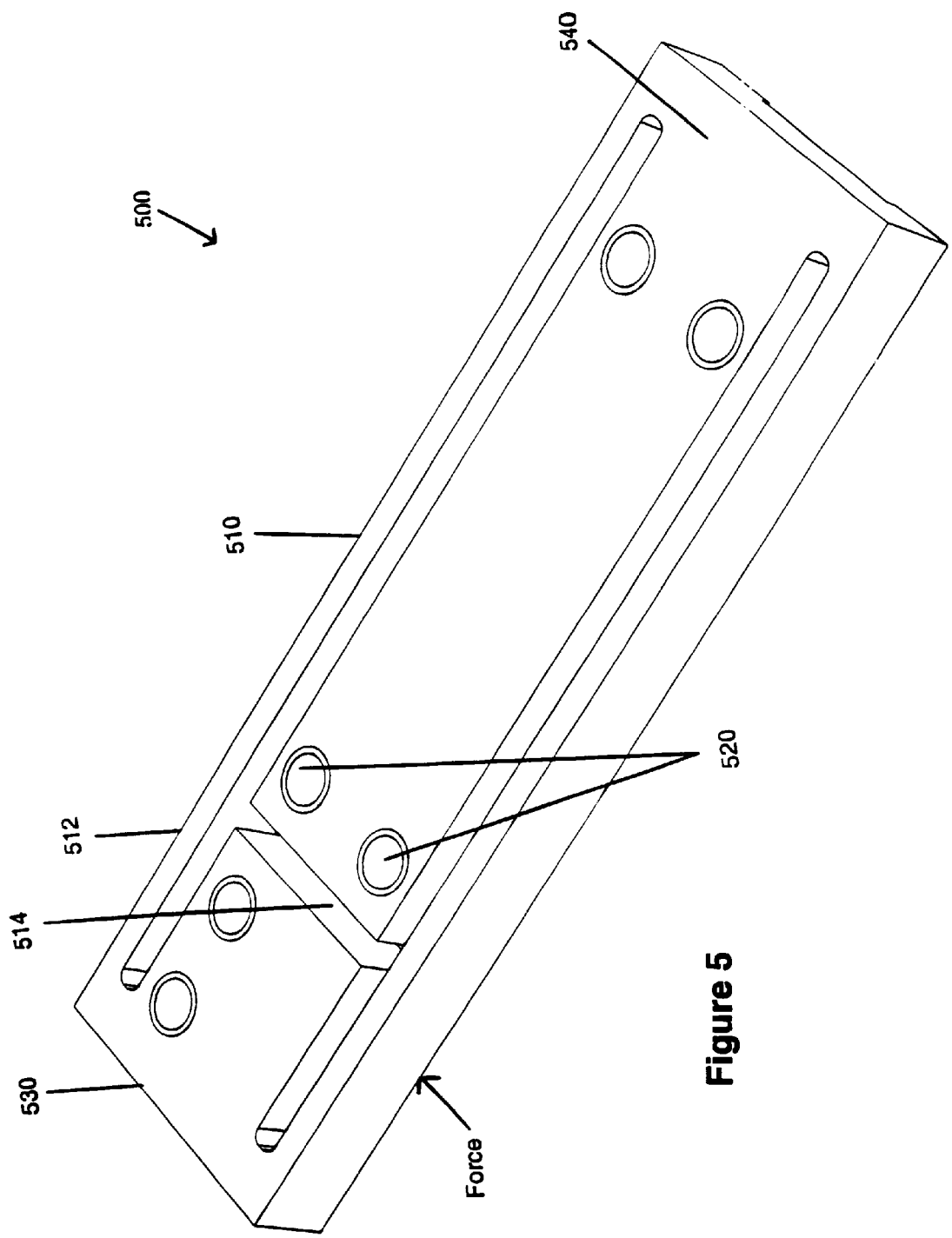
FIG. 5 illustrates a three-dimensional view of one embodiment of a bottom piece shown in FIG. 3.

FIG. 5 illustrates a three-dimensional view of one embodiment of the bottom piece 500 shown in FIG. 3. The bottom piece 500 includes an H-shaped beam 510 formed in the bottom piece 500. The H-shaped beam 510 allows a resilient portion 530 of the bottom piece 500 to translate laterally relative to a stationary portion 540 of the bottom piece 500 upon the application of force to the resilient portion 530. The horizontal aperture 514 of the H-beam separates the resilient portion 530 and the stationary portion 540 of the bottom piece 500. In one embodiment, the length of the resilient portion 530 is smaller than the length of the stationary portion 540. In one embodiment, the H-shaped beam 510 is formed in such a way so that the length 512 of the H-beam 510 is longer than the width of the bottom piece 500. In this embodiment, the dimensions of the H-beam 510 and the material of the bottom piece 500 allow for lateral translation without rotation of the bottom piece 500. FIG. 5 also shows one or more apertures 520 in the bottom piece 500 to allow one or more fasteners to couple the bottom piece 500 with the base piece and to couple the bottom piece 500 with the clamp.

In one embodiment, the bottom piece is made of a highly elastic aluminum. In an alternative embodiment, the bottom piece may be made of titanium. In another alternative embodiment, the bottom piece is made of delrin. In other alternative embodiments, the bottom piece may be made of other highly elastic and resilient materials.

Figure 6:
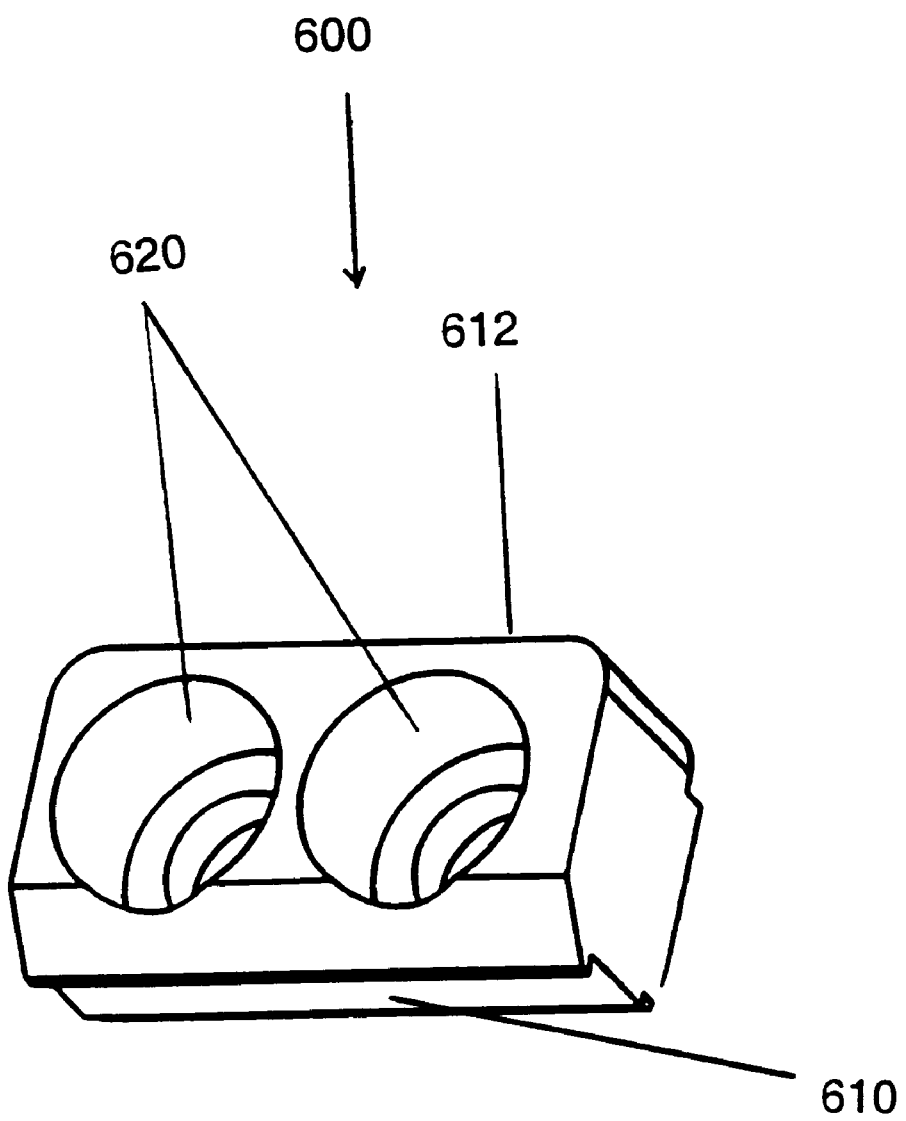
FIG. 6 illustrates a three-dimensional view of one embodiment of a clamp shown in FIG. 3.

FIG. 6 illustrate a three-dimensional view of one embodiment of the clamp 600 shown in FIG. 3. The clamp 600 includes a first side 612 and a second side 610. The second side 610 is a jaw capable of holding an optical element in place against the base piece. In one embodiment, the jaw includes a rubber piece coupled with the jaw that contacts the optical element when the jaw holds the optical element. The clamp 600 also includes one or more apertures 620 to allow one or more fasteners to couple the clamp 600 with the bottom piece. Accordingly, when the bottom piece moves, the clamp 600 will also move. The clamp 600 moves from a first position to a second position to allow an optical element to be placed into the groove of the base piece. The clamp 600 then moves back to the first position to lock and hold the optical element in place in the slot.

In one embodiment, the clamp is made of an organic material so that the jaw of the clamp does not damage the optical element. In an alternative embodiment, the clamp may be made of delrin. In other alternative embodiments, the clamp may be made of other materials. In addition, in different embodiments, the clamp may be designed so that the clamp may lock and hold different size optical elements without damaging them FIG. 7 illustrates a flow diagram of one embodiment of a process 700 of using a fiber carrier to facilitate in the manipulation of a fiber. At processing block 710, a portion on the fiber carrier is activated to enable the fiber carrier to receive a first portion of the fiber. At processing block 720, a flexure is attached to a second portion of the fiber away from the first portion. This is optional; in other embodiments, a flexure may not be used. At processing block 730, the fiber carrier is moved to a predetermined position. At processing block 740 the portion of the fiber carrier is activated to release the fiber. At processing block 750, the fiber is placed on a manufacturing station. In one embodiment, once the fiber carrier is moved to the predetermined position, an alignment tool engages with apertures in a flexure configured to the fiber and then the alignment tool places the fiber on the manufacturing station. Further detail about the alignment tool may be found in U.S. Pat. No. 6,207,950, entitled, "Optical Electronic Assembly Having A Flexure For Maintaining Alignment Between Optical Elements" issued on Mar. 27, 2001, and assigned commonly herewith.

In one embodiment, the fiber carrier is rotated to place the fiber in the predetermined position.

If it is determined that the fiber is not oriented in the correct direction, the fiber carrier is rotated to orient the fiber in another direction and the portion of the fiber carrier is activated to release the fiber.

Figure 8:
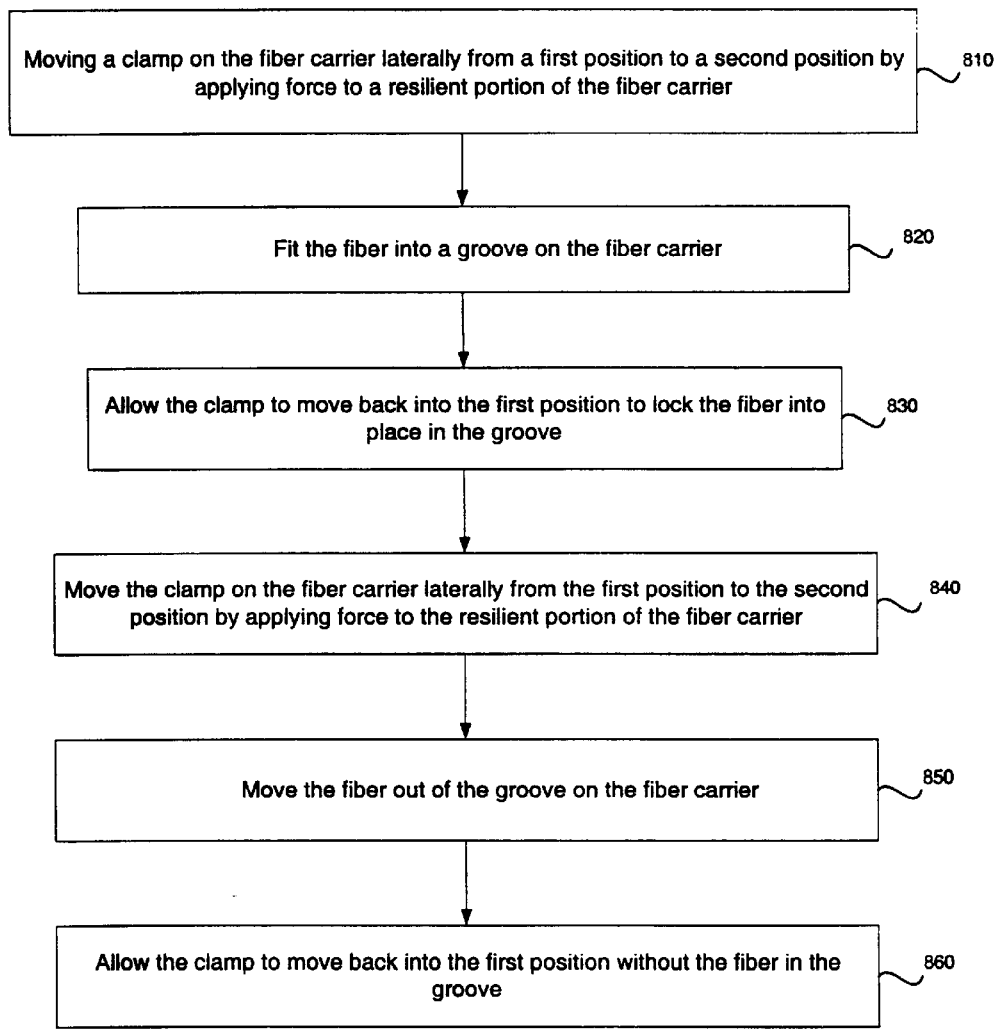
FIG. 8 is a flow diagram of one embodiment of a process of operating one embodiment of a fiber carrier.

FIG. 8 illustrates a flow chart of one embodiment of a process 800 of operating a fiber carrier. At processing block, 810, a clamp on the fiber carrier is moved laterally from a first position to a second position by applying force to a resilient portion of the fiber carrier. At processing block 820, the fiber is fitted into a groove on the fiber carrier. At processing block 830, the clamp is allowed to move back into the first position to lock the fiber into place in the groove. In this way, the fiber may be securely and safely carried from one location to another using the fiber carrier. At processing block 840, the clamp on the fiber carrier is moved laterally from the first position to the second position by applying force to the resilient portion of the fiber carrier. At processing block 850, the fiber is moved out of the groove on the fiber carrier. At processing block 860, the clamp is allowed to move back into the first position without the fiber in the groove.

Accordingly, a fiber carrier and method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A method, comprising:
   moving a first portion of a fiber carrier from a first position to a second position relative to a second portion of the fiber carrier by applying a lateral force to the first portion to enable the second portion of the fiber carrier to receive a first portion of the fiber;
   removing the lateral force to allow the first portion of the fiber carrier to reposition to the first position to hold the first portion of the fiber within the fiber carrier;
   moving the fiber carrier to a predetermined position; and
   moving the first portion of the fiber carrier to the second position again to release the fiber.

2. The method of claim 1 further comprising attaching a flexure to a second portion of the fiber away from the first portion of the fiber.

3. The method of claim 1 further comprising rotating the fiber carrier to orient the fiber in another position.

4. The method of claim 1 further comprising placing the fiber carrier on a manufacturing station.

5. A method, comprising:
   activating a portion on a fiber carrier to enable the fiber carrier to receive a first portion of a fiber;
   holding the first portion of the fiber within the fiber carrier;
   moving the fiber carrier to a predetermined position; and
   activating the portion on the fiber carrier to release the fiber;
   wherein activating a portion on the fiber carrier to enable the fiber carrier to receive a first portion of the fiber comprises:
      moving a clamp on the fiber carrier laterally from a first position to a second position by applying a force to a resilient portion of the fiber carrier;
      inserting the fiber into a groove on the fiber carrier; and
      removing the force to allow the clamp to move back into the first position to lock the fiber in the groove.

6. The method of claim 5 wherein activating the portion of the fiber carrier to release the fiber comprises:
   moving the clamp on the fiber carrier laterally from the first position to the second position by applying a force to the resilient portion of the fiber carrier;
   moving the fiber out of the groove on the fiber carrier; and
   removing the force to allow the clamp to move back into the first position after the fiber is removed from the groove.

7. The method of claim 6 wherein the resilient portion and a stationary portion of a bottom piece of the fiber carrier are defined by an H-shaped beam formed in the bottom piece.

8. The method of claim 7 wherein a length of the H-shaped beam is longer than a width of the bottom piece.

9. The method of claim 8 wherein length of the resilient portion is smaller than length of the stationary portion of the bottom piece.

10. The method of claim 6 wherein moving the clamp back into the first position to lock the fiber with the fiber carrier includes holding the fiber between a base piece and a jaw of the clamp of the fiber carrier.

11. The method of claim 10 wherein the jaw includes a rubber piece coupled with the jaw that contacts the fiber as the fiber is held by the jaw.

12. The method of claim 10 wherein the base piece includes at least one aperture to allow the base piece to be coupled with a bottom piece via at least one fastener.

13. The method of claim 12 wherein the bottom piece includes at least one aperture to allow the bottom piece to be coupled with the clamp and the base piece via at least one fastener.

14. The method of claim 13 wherein the clamp includes at least one aperture to allow the clamp to be coupled with the bottom piece via at least one fastener.

15. The method of claim 10 wherein the base piece is made of steel.

16. The method of claim 5 wherein the clamp is made of an organic material.

17. The method of claim 7 wherein the bottom piece is made of aluminum.

18. The method of claim 7 wherein the bottom piece is made of delrin.

19. A system to facilitate in the manipulation of a fiber comprising:
   a fiber carrier to hold a first portion of the fiber, the fiber carrier including a first portion and a second portion, the first portion is a resilient portion movable relative to the second portion, the first portion of the fiber being received by moving the first portion of the fiber carrier from a first position to a second position, and the first portion of the fiber being held within the fiber carrier by releasing the first portion of the fiber carrier back to the first position; and
   a manipulating mechanism to move the fiber carrier.

20. The system of claim 19 further comprising a flexure attached to a second portion of the fiber away from the first portion of the fiber.

21. A fiber carrier comprising:
   a base piece having a groove for holding a fiber;
   a bottom piece coupled with the base piece, the bottom piece having a resilient portion and a stationary portion, the resilient portion capable of lateral movement in response to application of a force; and
   a clamp coupled with the bottom piece to lock the fiber in place in the groove, the clamp capable of moving to release the fiber upon the lateral movement of the resilient portion of the bottom piece.

22. The fiber carrier of claim 21 wherein the bottom piece includes an H-shaped beam that includes the resilient portion and the stationary portion.

23. The fiber carrier of claim 22 wherein length of the H-shaped beam is longer than a width of the bottom piece.

24. The fiber carrier of claim 23 wherein length of the resilient portion is smaller than a length of the stationary portion of the bottom piece.

25. The fiber carrier of claim 21 wherein the clamp comprises:
   a first side; and
   a second side having a jaw capable of holding the fiber against the base piece.

26. The fiber carrier of claim 25 wherein the jaw includes a rubber piece coupled with the jaw that contacts the fiber as the fiber is held by the jaw.

27. The fiber carrier of claim 21 wherein the base piece includes at least one aperture to allow the base piece to be coupled with the bottom piece via at least one fastener.

28. The fiber carrier of claim 21 wherein the bottom piece includes at least one aperture to allow the bottom piece to be coupled with the clamp and the base piece via at least one fastener.

29. The fiber carrier of claim 21 wherein the clamp includes at least one aperture to allow the clamp to be coupled with the bottom piece via at least one screw via at least one fastener.

30. The fiber carrier of claim 21 wherein the base piece is made of steel.

31. The fiber carrier of claim 21 wherein the clamp is made of an organic material.

32. The fiber carrier of claim 21 wherein the bottom piece is made of aluminum.

33. The fiber carrier of claim 21 wherein the bottom piece is made of delrin.

* * * * *